United States Patent [19]

Enggasser et al.

[11] Patent Number: 5,417,908
[45] Date of Patent: May 23, 1995

[54] PROCESS FOR THE PREPARATION OF POLYESTER, A POLYESTER AND ITS USE

[75] Inventors: Josiane Enggasser, Emmenbrücke; Roland Stahlin, Ebikon, both of Switzerland; Paul Gesche, Franche-Ville, France

[73] Assignee: Rhone-Poulenc Viscosuisse SA, Emmenbrücke, Switzerland

[21] Appl. No.: 167,720

[22] Filed: Dec. 15, 1993

Related U.S. Application Data

[63] Continuation of Ser. No. 930,389, filed as PCT/CH92/00007, Jan. 14, 1992, abandoned.

[30] Foreign Application Priority Data

Jan. 16, 1991 [CH] Switzerland ............... 107/91

[51] Int. Cl.[6] ............... B29C 47/00; C08G 63/82
[52] U.S. Cl. ............... 264/177.13; 528/272; 528/277; 528/283; 528/287; 528/308.3; 528/308.6; 524/706; 524/779; 524/401; 524/414; 524/440; 428/34.7; 428/35.7; 428/221; 428/364; 264/176.1; 264/177.14; 264/209.1
[58] Field of Search ............... 528/272, 277, 283, 287, 528/308.3, 308.6; 524/706, 779, 401, 414, 440; 428/34.7, 35.7, 221, 364; 264/176.1, 209.1, 177.13, 177.14

[56] References Cited

U.S. PATENT DOCUMENTS

| | | |
|---|---|---|
| 3,988,301 | 10/1974 | Jeurissen et al. |
| 4,107,149 | 8/1978 | Bier et al. ............... 528/309 |
| 4,182,842 | 1/1980 | Winston et al. ............... 528/292 |
| 4,424,140 | 1/1984 | Weinberg et al. ............... 502/155 |

FOREIGN PATENT DOCUMENTS

| | | |
|---|---|---|
| 20244952 | 8/1970 | France . |
| 25700771 | 4/1986 | France . |
| 7219178 | 6/1972 | Japan . |
| 7343669 | 12/1973 | Japan . |
| 55-137217 | 10/1980 | Japan . |

OTHER PUBLICATIONS

Vestig Akad. Navuk BSSR, Ser. Khim. Mavuk, vol. 1, pp. 105–108.
Research Disclosure, No. 128, pp. 25–26.
J. Appl. Polym. Sci., vol. 8, No. 25, pp. 1685–1694.
Chemical Abstracts, vol. 78, No. 6, 12 Feb. 1973 & JP A 7219, 178.
Chemical Abstracts, vol. 81, No. 20, 18 Nov. 1974, & JP A 73 43 190.
Chemical Abstracts, vol. 78, No. 6, 12 Feb. 1973, & JP A 72 19 179 R. Gutmann, Text. Prax. Int., 44(1), 29/30, 33, 1989.

*Primary Examiner*—Samuel A. Acquah
*Attorney, Agent, or Firm*—Michael J. Striker

[57] ABSTRACT

Process for making a polyester having polyethylene terephthalate units including transesterifying a terephthalic acid ester with a glycol using a manganese salt as catalyst and then subjecting the product to a polycondensation reaction using a germanium-containing catalyst to form a polyester; adding phosphorous compounds to block 80 to 99% by weight of the active manganese salt thus leaving an unblocked portion of the manganese salt prior to the polycondensation; and adding 10 to 100 ppm of Ge at the end of a ethylene glycol stage of the polymerization so that the Ge and the unblocked portion of the manganese salts provide the germanium-containing catalyst for the polycondensation reaction. The P/Mn molar ratio being less than 1. The reaction mixture contains 10 to 100 ppm of manganese during the reaction.

12 Claims, No Drawings

PROCESS FOR THE PREPARATION OF POLYESTER, A POLYESTER AND ITS USE

This application is a continuation of application Ser. No. 07/930,389, filed as PCT/CH92/00007, Jan. 14, 1992, now abandoned.

BACKGROUND OF THE INVENTION

The invention relates to a process for the preparation of a polyester composed of polyethylene terephthalate units, in which process a terephthalic acid ester is transesterified with a glycol using a manganese salt as catalyst and is then subjected to a polycondensation reaction using a germanium-containing mixed catalyst, the polyester and its use.

The preparation of a polyester composed of polyethylene terephthalate units is known. To this end, customarily, an acid component, such as terephthalic acid, and a glycol component, such as ethylene glycol, are esterified directly or subjected to a transesterification reaction. Catalysts are required in both cases, and amongst these a combination of manganese/antimony has proved to be the most suitable.

As a consequence of the more rigorous legislation in numerous industrial countries, the disposal of antimony, which is recognised as toxic, is an increasingly difficult problem. Therefore, to avoid this disposal problem numerous attempts have been made to prepare an antimony-free polyester.

Thus, the use of Ti glycolate, Ge glycolate or Al glycolate instead of antimony glycolate is proposed by R. Gutmann, Text. Prax. Int., 44 (1), 29/30, 33, 1989.

In this publication the preparation and properties of these glycolates are discussed. The preparation of glycolates of constant pure quality in a separate process step is very laborious. No information is to be found in this publication with respect to the time and place at which the polycondensation catalyst is added.

DE-A-16 45 496 discloses a process for the preparation of polyesters without antimony, in which process cerium compounds which are soluble in ethylene glycol are used with simultaneous use of organic phosphorus derivatives. The addition of a specific organic phosphorus compound together with a soluble cerium compound prior to the polycondensation reaction resulted in improved whiteness compared with that obtained by the addition of conventional phosphorus compounds.

SUMMARY OF THE INVENTION

The object of the invention is to replace antimony as polycondensation catalyst, in particular in the preparation of polyesters, by a catalyst, without the other characteristics, such as stability to heat, stability to thermal oxidation and photostability being impaired.

A further object is to increase the whiteness of the polyester at the same time.

The object is achieved according to the invention in that 80–99% by weight of the active manganese salt are blocked by phosphorus compounds and the manganese remaining free is used after the addition of 10–100 ppm of Ge at the end of the glycol stage as cocatalyst for the catalysis of the polycondensation reaction, the P/Mn molar ratio being <1.

An essential advantage of an antimony-free catalyst is that no heavy metals are present in the polymer itself, and that no leachable toxic antimony compounds are into the effluent system and into the environment. A further advantage is the use of inorganic phosphorus compounds, which, in contrast to the organic phosphorus compounds, are not toxic.

A further advantage is that only extremely small amounts of phosphorus are required to block the manganese. The P/Mn molar ratio of <1 is far below known molar ratios. Since some of the Mn still remains free, a small amount of polycatalyst is required. This has the advantage that fewer foreign substances are present in the polymer, which substances in most cases interfere during further processing.

The addition of a germanium complex immediately prior to the vacuum stage has the advantage of lowering the diethylene glycol content, because it is fed into a mixture depleted in glycol. The germanium catalyst which has proved most suitable is a germanium salt containing an alkali metal cation, in particular sodium or potassium. Preferably, 10–100 ppm of Mn and 10–100 ppm of Ge based on a total weight of the terephthalic acid ester present are present in the polycondensation stage.

The resulting polyester granules have a reflectance of more than 52%, measured at a wavelength of 426 nm. Such a high reflectance gives a surprisingly good whiteness.

The polyester is suitable for use in bottles, sheets and filaments.

The invention will be illustrated in more detail with the aid of examples.

DETAILED DESCRIPTION OF THE PREFERRED EMBODIMENTS

The following batch and processes steps 1–4 apply to all examples.

In a preferred embodiment of the process of the invention an autoclave is charged with:

| | |
|---|---|
| Dimethyl terephthalate: | 51.5 mol |
| Ethylene glycol: | 98.2 mol |
| Manganese acetate.2-hydrate: | 90 ppm of Mn (with respect to the dimethyl terephthalate) |

1. Transesterification

The transesterification reaction is carried out in the stirred autoclave (40 rev/min) in the temperature range from 160° to 230° C. over a period of 120 min. During this operation the methanol is distilled off quantitatively via a separating column.

2. Additives

The additives are added to the reaction mass in the temperature range between 230° C. and 235° C. The additives added are 0.4% of $TiO_2$, as matting agent, and 0.075% of antioxidant (Irganox 1010 ®) (trade name of CIBA-GEIGY, Basle, Switzerland)), both suspended in ethylene glycol. The CIBA-GEIGY antioxidant, Irganox 1010 ®, is tetrakis-(methylene-3-(3', 5'-di-t-butyl-4'-hydroxyphenyl)-propionate) methane.

3. Ethylene glycol stage

The ethylene glycol stage is carried out in the temperature range from 230° to 245° C. over a period of about 30 min.

4. Polycondensation

The polycondensation reaction is carried out in the temperature range from 245° to 285° C. over a period of 200 min, by, in a first step, establishing a progressive vacuum (1000→50 mbar) over a period of 40 min and, in a second step, initiating a high vacuum stage p <1 mbar.

EXAMPLES

Example 1 (Comparison Example)

In Example 1 the addition is made in the customary concentration of 334 ppm of antimony (in the form of antimony trioxide) after blocking the transesterification catalyst by means of phosphorous acid in a P/Mn molar ratio of 1.2.

Example 2 (Comparison Example)

In Example 2 no blocking of the transesterification catalyst whatsoever is carried out.

Examples 3 and 4

In Examples 3 and 4, after the methanol stage, the manganese transesterification catalyst is blocked at a temperature of the reaction mass of 230° C. using a P compound ($H_3PO_3$) in a P/Mn molar ratio of 0.66 and 0.89 respectively. The manganese which has remained free acts as polycondensation catalyst.

Examples 5 to 7

In Examples 5 to 7, the transesterification catalyst is blocked using a compound ($H_3PO_3$) in a P/Mn molar ratio of 0.89 and 0.83 respectively.

At the end of the glycol stage, that is to say immediately prior to the vacuum stage, the polycondensation catalyst sodium germanate 1-hydrate, dissolved in ethylene glycol, is added. The manganese which has remained free and the germanium act as mixed catalyst.

A summary representation of the illustrative embodiments can be seen in Table 1.

TABLE 1

| | Illustrative embodiments | | | | | |
|---|---|---|---|---|---|---|
| Ex-am-ples | Manga-nese (ppm) | P/Mn molar ratio | Anti-mony (ppm) | Germa-nium (ppm) | Irganox* 1010 (%) | $TiO_2$ (%) |
| 1 | 90 | 1.2 | 334 | — | — | 0.4 |
| 2 | 90 | | — | — | 0.075 | 0.4 |
| 3 | 90 | 0.66 | — | — | 0.075 | 0.4 |
| 4 | 90 | 0.89 | — | — | 0.075 | 0.4 |
| 5 | 90 | 0.89 | — | 75 | 0.075 | 0.4 |
| 6 | 90 | 0.89 | — | 60 | 0.075 | 0.4 |
| 7 | 90 | 0.83 | — | 75 | 0.075 | 0.4 |

The properties of the polymer are shown in Table 2.
*The CIBA-GEIGY antioxidant Irganox 1010 is tetrakis-(methylene-3-(3', 5'-di-t-butyl-4'-hydroxyphenyl)-propionate)methane.

The ppm values for Ge and Mn are based on a total weight of the terephthalic acid ester present.

TABLE 2

| | Properties obtained | | | | |
|---|---|---|---|---|---|
| Ex-am-ples | VI | CEG (mole/ ton) | DEG (%) | REF at 426 nm (%) | Tox (°C.) | Polycondensation stage time (min) |
| 1 | 74.0 | 22 | 0.7 | 52.0 | 258 | 200 |
| 2 | 76.5 | 23 | 0.65 | 41.0 | 265 | 135 |
| 3 | 75.0 | 20 | 0.50 | 48.0 | 268 | 175 |
| 4 | 80.0 | 19 | 0.50 | 52.0 | 268 | 265 |
| 5 | 80.0 | 20 | 1.1 | 58.5 | 265 | 240 |
| 6 | 75.0 | 20 | 1.0 | 58.5 | 268 | 250 |
| 7 | 74.0 | 22 | 1.0 | 59.5 | 268 | 200 |

It can be seen from these experiments that the best polymer properties and a polycondensation time similar to that for Comparison Example 1 are obtained with Example 7.

Comparison of the whiteness, measured on dtex 76f30 filaments, for Examples 1 and 7.

| | Example 1 | Example 7 |
|---|---|---|
| Reflectance at 426 nm (%) | 81.8 | 83.7 |

The abbreviations have the following meanings:
VI: viscosity index (measured in phenol/ dichlorobenzene 1:1)
CEG: carboxyl end groups
REF: reflectance at 426 nm
Tox: temperature at which the oxidative decomposition starts
DEG: diethylene glycol While the invention has been illustrated and embodied in a polyester and method of making same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art,fairly constitute essential characteristics of the generic or specific aspects of this invention.

What is claimed is new and desired to be protected by Letters Patent is set forth in the appended claims:

1. Process for making polyethylene terephthalate polyesters, said process comprising the steps of:
   a) performing a transesterification of a terephthalic acid ester with a glycol in the presence of a transesterification catalyst in a reaction mixture to form a transesterification product, said transesterification catalyst being free of antimony and consisting of a manganese salt and said manganese salt being present in said reaction mixture in an amount providing 10 to 100 ppm of manganese with respect to a total weight of said terephthalic acid ester present in said reaction mixture initially prior to the transesterification;
   b) after the transesterification performed in step a), adding an amount of inorganic phosphorus compounds sufficient to block 80 to 99% by weight of the manganese salt and leave a free portion of the manganese salt, a molar ratio of P/Mn in the reaction mixture being less than 1 after the adding of the inorganic phosphorus compounds to the reaction mixture;
   c) after the transesterification performed in step a), adding to the reaction mixture 10 to 100 ppm of Ge with respect to the total weight of said terephthalic acid ester present in the reaction mixture initially prior to the transesterification; and
   d) after the adding of the Ge and the inorganic phosphorus compounds in steps b) and c), performing a polycondensation of said product formed in step a) in the presence of a polycondensation catalyst consisting of said free portion of said manganese salt and said 10 to 100 ppm of Ge to form a polyethylene terephthalate polyester.

2. Process as defined in claim 1, wherein said Ge is added to the reaction mixture by adding a germanium salt to the reaction mixture.

3. Process as defined in claim 2, wherein said germanium salt contains alkali metal cations.

4. Process as defined in claim 2, wherein said germanium salt is selected from the group consisting of sodium and potassium germanates.

5. Polyethylene terephthalate polyester made by the process defined in claim 1, and having a reflectance greater than 52% at a wavelength of 426 nm.

6. Process for making a polyethylene terephthalate polyester, said process comprising the steps of:

a) performing a transesterification of dimethyl terephthalate with ethylene glycol in a reaction mixture in the presence of an antimony-free transesterification catalyst consisting of a manganese salt at temperatures from 160° to 230° C. to form methanol and an ester product, wherein said manganese salt present in said reaction mixture provides 10 to 100 ppm of manganese based on a total weight of said terephthalic acid ester present in said reaction mixture prior to the transesterification;

b) removing the methanol from the reaction mixture by distilling;

c) then heating the reaction mixture to temperatures from 230° to 245° C.;

d) when the temperature of the reaction mixture reaches 230° C., adding a sufficient amount of an inorganic phosphorous compound to the reaction mixture to provide a molar ratio of P/Mn in the reaction mixture of from 0.66 to 0.89 and to form a blocked portion of the manganese salt and a free portion of the manganese salt; and e) after adding of the inorganic phosphorus compound to the reaction mixture, adding 10 to 100 ppm of germanium by adding a germanium compound to the reaction mixture to provide a germanium-containing antimony-free polycondensation catalyst consisting of the free portion of the manganese salt and the germanium compound, wherein said 10 to 100 ppm of said germanium is based on a total weight of said terephthalic acid ester present in said reaction mixture initially prior to the transesterification; and f) performing a polycondensation of the ester product formed in step a) in the reaction mixture in the presence of the germanium-containing antimony-free polycondensation catalyst at temperatures from 245° to 285° C. to form the polyethylene terephthalate polyester;

wherein antimony-containing compounds are not present in the reaction mixture during the transesterification and the polycondensation.

7. Method of making a bottle comprising using the polyester of claim 5.

8. Method of making a sheet comprising using the polyester of claim 5.

9. Method of making a filament using the polyester of claim 5.

10. Process as defined in claim 6, wherein the manganese salt is manganese acetate 2-hydrate and the inorganic phosphorous compound is $H_3PO_3$.

11. Process as defined in claim 6, wherein the germanium compound is a germanium salt.

12. Process as defined in claim 11, wherein the germanium salt is sodium germanate 1-hydrate.

* * * * *